No. 608,705. Patented Aug. 9, 1898.
W. A. NEAL.
COMBINED FOLDING COOP AND TRAP.
(Application filed Nov. 17, 1897.)
(No Model.) 2 Sheets—Sheet 1.
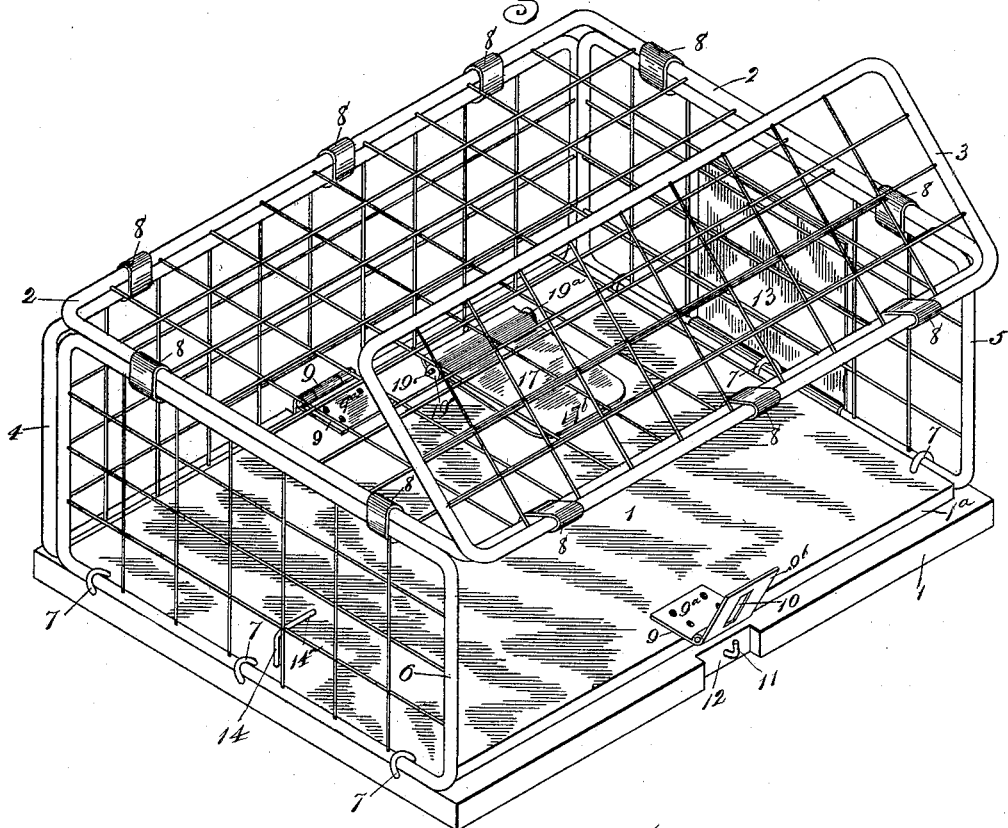

No. 608,705. W. A. NEAL. Patented Aug. 9, 1898.
COMBINED FOLDING COOP AND TRAP.
(Application filed Nov. 17, 1897.)
(No Model.) 2 Sheets—Sheet 2.
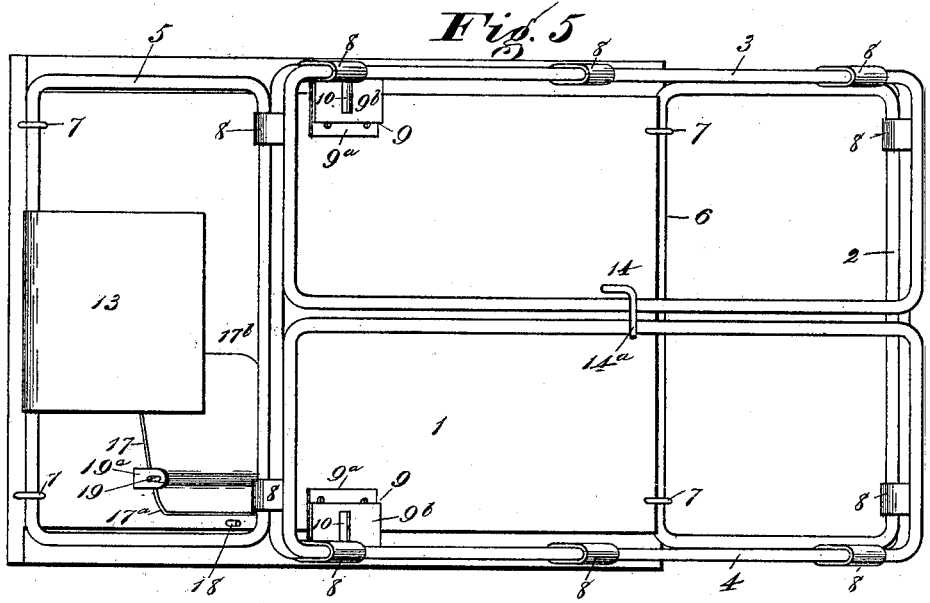
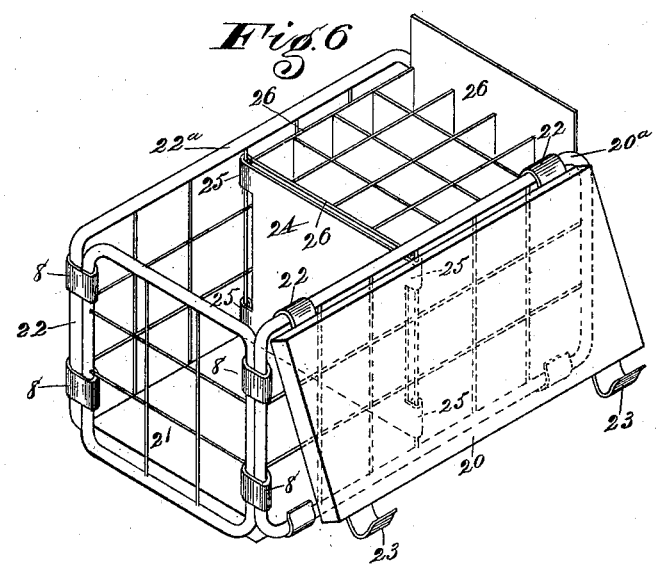
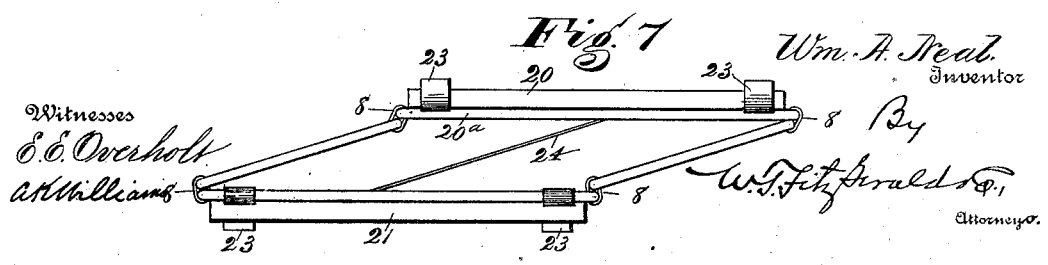

UNITED STATES PATENT OFFICE.

WILLIAM A. NEAL, OF BUNGERS, WEST VIRGINIA.

COMBINED FOLDING COOP AND TRAP.

SPECIFICATION forming part of Letters Patent No. 608,705, dated August 9, 1898.

Application filed November 17, 1897. Serial No. 658,863. (No model.)

*To all whom it may concern:*

Be it known that I, WILLIAM A. NEAL, a citizen of the United States, residing at Bungers, in the county of Greenbrier and State of West Virginia, have invented certain new and useful Improvements in a Combined Folding Coop and Trap; and I do hereby declare the following to be a full, clear, and exact description of the invention, such as will enable others skilled in the art to which it appertains to make and use the same.

My invention has relation to folding coops, crates, boxes, &c., the object being to provide a substantial coop or crate which may be folded together so as to occupy the smallest possible amount of space in reshipment.

My invention will be fully set forth in the specification and accompanying drawings, forming a part thereof, in which—

Figure 1 is a perspective view of my improved coop, showing one of the side sections partially folded back upon the top section. Fig. 2 is a side elevation thereof, showing the coop in process of being folded together, with the side sections already folded back upon the top section. Fig. 3 shows my coop used as a trap, the wire-netting being removed, as is also the case in Fig. 5, so that the essential features brought out in the drawings may not be obscured by the commingling of so many lines. Fig. 4 is a perspective view of the rod or trigger used with said trap. Fig. 5 shows the coop secured in its folded position ready for reshipment. Fig. 6 is a perspective view of a folding crate or box, one end thereof being shown provided with fillers ready to receive eggs for shipment. Fig. 7 is a top or bottom view of Fig. 6, showing the crate in process of being folded together.

For sake of convenience the same reference-numerals will refer to the same parts throughout the various figures of the drawings.

My coop consists of the bottom 1, the top section 2, the side sections 3 and 4, and the end sections 5 and 6. The bottom is made, preferably, of wood, and in the present instance the top and side and end sections are shown as composed of wire-netting, the outer rim of said sections being made of heavier material—as, for instance, small rod-iron; but it is understood, of course, that my coop may be made of any preferred material and that each or all of the various sections thereof may be made solid or composed of netting or of perforated material or in any other desired manner.

The end sections 5 and 6 are secured to the bottom of the coop by the hinges or brackets 7. The side sections are not secured to the bottom, but both side and end sections are secured to the top section by the hinges 8. While in use the side sections are held in operative position by the hinged plates 9, suitably attached to the bottom of said coop near the sides thereof.

It will be observed that the sections $9^a$ of plates 9 overlap the cut-away portion extending all around the bottom 1, near its edge, forming the continuous shoulder $1^a$, (one of said plates being clearly shown in Fig. 1.) Section $9^b$ of said plate is provided with the rectangular hole 10, through which passes the securing-pin 11, the outer end of which is bent at a right angle to the body thereof, said pin being suitably secured in the recess 12, formed in the outer edge of bottom 1 and of suitable width to receive section $9^b$ of plate 9 and of suitable depth to prevent said pin from being easily brought into contact during transportation with anything that might turn the same out of its operative position.

When the side sections are lowered into their operative positions, the projecting portions $9^a$ of plate 9 will overlap the lower sides of the frames of said side sections, whereupon the sections $9^b$ of said plates are received by the recesses 12 and are locked in this position by giving a partial turn to the securing-pins 11.

One of the end sections of the coop is provided with the door 13. When it is desired to fold the coop, the side sections are first folded back upon the top section. Then the top section is moved longitudinally, as shown in Fig. 2, till it comes down in contact with the bottom of the coop, as shown in Fig. 5. By a proper rotation of the securing-catch 14, secured to the bottom of the coop, the bent section thereof, $14^a$, is caused to overreach the inner sides of the inwardly-folded side sections, and thereby the coop is securely held in its folded position.

My coop may be easily converted into a trap, as shown in Fig. 3. To accomplish this, I employ the spring 15, the bar 16, and the trencher 17, and the pin 18. The spring 15 is attached at one end to the lower side of one of the side sections, preferably near the middle thereof, and at the other end to the parts diagonally opposite that to which the first end was attached. Said side section now constitutes the door of the trap. To set the trap, the door is propped open by the bar 16, the end of said bar being flattened and made concave at 16ᵃ to receive the circumference of the bar with which it is designed to come in contact when in use. The other end is also flattened and when the trap is set rests against the pin 18.

The trencher 17 is pivotally mounted near one end on the journals 19, the latter being received by the standards 19ᵃ. The shorter end 17ᵃ of the trencher 17 lies close to the pin 18, so that when the inner end 16ᵇ of rod 16 is placed against said pin 18 said shorter end 17ᵃ of trencher 17 is depressed or lowered and the other end 17ᵇ is elevated. The bait is put on the trencher, so that the game to be caught shall step thereon and depress the longer end of the same. This will cause the short end 17ᵃ to rise and will elevate the end 16ᵇ of rod 16 above the top of pin 18, leaving said bar no further support against the tension of spring 15, which operates to suddenly close door 3, throwing the bar 16 out of the cage through the netting. If solid doors or sides are used, there will of course be a hole provided in the side section of cage immediately opposite pin 18, through which the bar may pass when the trap is sprung. As will seen from Fig. 4, the planes of the two flattened ends of bar 16 are substantially at right angles to each other.

Fig. 6 illustrates the folding principle of my invention as applied to a box which is adapted to be used for shipping goods of different kinds, fruits, berries, eggs, &c.

The top of the box 20 is hinged to the top bar of the side section 20ᵃ, and the bottom 21, which is exactly similar to the top in every respect, is hinged to the lower bar of the other side section 22, so that the hinges on the two sides are diagonally opposite each other. The hinges 22 may extend entirely across the lid of the box (near each end) and terminate in the hooked ends 23. When the lid is closed, these hooked ends will hook over the top bar 22ᵃ of side section 22 and will serve to hold the lid closed. The bottom of the box is provided with hooks exactly similar, which operate in the same way. In fact it is a matter of indifference as to which is considered the top and which the bottom lid of the box.

When it is desired to fold the box after it is emptied of its contents, the lids are opened back against the side sections to which they are hinged, and since the side and end sections are hinged together at the four corners of the box it is plain that by simultaneously moving one side longitudinally in one direction and the other longitudinally in the opposite direction the two sides will approach each other till they touch or come together.

When found desirable, the box may be provided with one or more partitions. The box illustrated in Fig. 6 shows one such partition 24. Said partition is provided with the hinges 25, adapted to connect said partition with the side sections of the crate, so that in folding the partition folds just as do the end sections of the box, as shown in Fig. 7. Fig. 6 further shows one end of the box as used for an egg-crate. Of course the side and end sections of the box when used for this purpose may be made of solid material, if desired; but when made of coarse wire-netting, as here shown, the four sides of each section should be provided with the auxiliary siding 26, made, preferably, of pasteboard, one of said pieces of siding being slightly withdrawn that it may be more easily seen.

When the auxiliary siding is in its proper place, the ordinary pasteboard egg-fillers are placed in the receptacle thus formed and filled with eggs in the usual manner.

When the crate is filled with eggs, a piece of pasteboard the size of the lid of the crate should be laid over the top of the eggs, a similar piece having been placed in the bottom of the box. The lid is then closed and the crate is ready for shipment.

When it is desired to fold the crates for returning, the top and bottom pasteboard covers are laid between the lids and their respective side sections. The fillers are then taken out and collapsed in the usual manner and, together with the auxiliary siding, are placed in the box, and the box is then folded together upon them, which, while not folding quite so close together as when there is nothing in the box, yet occupies a very small space.

Having shown different ways in which my invention may be applied to practical use, it will be understood that I do not wish to limit myself to the exact showing made, but desire protection in all that comes clearly within the spirit and scope of my invention.

Having thus fully described my invention, what I claim as new, and desire to secure by Letters Patent, is—

1. A folding coop having a rigid base with an external recess around its edge, end sections pivotally secured in the recess, a top having sides pivotally secured thereto, the lower edges of the latter resting in said recess, and means to lock the same in position, consisting of a hinged plate secured to the base and having a perforated part extending over the recess and a securing-pin entering said perforation, all combined and arranged as set forth.

2. The herein-described combined folding coop and trap consisting of a folding coop proper, substantially as specified; a trigger secured to the floor of said trap; a door-sustaining rod in coöperation with said trigger and a retraction-spring so connected to said door that it will be violently closed when the trigger mechanism is actuated, substantially as specified and for the purpose set forth.

3. In a combined folding coop and trap, the combination with a suitable collapsing frame, of a sustaining-rod for engagement with the door; a trigger mechanism consisting of the pivoted platform 17 and the retaining-stop 18 and the door-prop section 16 in combination with suitable means for violently closing the door when the trigger mechanism is released, substantially as specified and for the purpose set forth.

4. The herein-described combined coop and trap consisting of the rigid base provided with a recess around its outer edge; end sections pivotally secured to said base; a top section pivotally attached to the upper sides of said end sections; side sections pivoted to the outer edge of said top section; a brace or prop designed for holding one of said side sections in an open position; a trigger mechanism designed to receive the lower end of said prop consisting of a platform pivotally secured near one end in supporting ears or bearings, the shorter end of said platform being curved upward to engage said prop, and a spring connecting said open section and an adjacent part of the trap whereby said open section will be violently closed when said trigger mechanism releases said prop, all operatively combined in the manner and for the purpose set forth.

In testimony whereof I affix my signature in presence of two witnesses.

WILLIAM A. NEAL.

Witnesses:
   CHAS. L. NEAL,
   H. W. DONNALLY.